United States Patent
Huffman et al.

(10) Patent No.: US 6,763,531 B1
(45) Date of Patent: Jul. 20, 2004

(54) METHOD FOR THE CONTAINMENT OF FLUIDS FROM AN AIRCRAFT COMMODE

(75) Inventors: Scott W. Huffman, North Olmsted, OH (US); Charles J. Flury, Olmsted Township, OH (US); Donald J. Huffman, Olmsted Falls, OH (US)

(73) Assignee: Aircraft Facilities Products, LLC, North Olmsted, OH (US)

( * ) Notice: Subject to any disclaimer, the term of this patent is extended or adjusted under 35 U.S.C. 154(b) by 0 days.

(21) Appl. No.: 10/464,038

(22) Filed: Jun. 18, 2003

(51) Int. Cl.[7] ............................................. E03D 11/00
(52) U.S. Cl. ............................. 4/251.1; 4/300.3; 4/901
(58) Field of Search ............................. 4/251.1, 251.2, 4/300.3, 901, 661, 420

(56) References Cited

U.S. PATENT DOCUMENTS

| | | | | |
|---|---|---|---|---|
| 4,285,075 A | * | 8/1981 | Nelson | ............... 4/251.1 |
| 5,067,185 A | * | 11/1991 | Kohler | ............... 4/661 |
| D341,414 S | * | 11/1993 | Baker | ............... D23/310 |
| 5,404,897 A | | 4/1995 | Rozenblatt | |
| 5,815,851 A | * | 10/1998 | Perry | ............... 4/300.3 |
| 6,101,641 A | | 8/2000 | Hawkins et al. | |
| 6,457,188 B1 | * | 10/2002 | Lindberg | ............... 4/420 |
| 2002/0142125 A1 | | 10/2002 | Seal | |

* cited by examiner

Primary Examiner—Gregory Huson
Assistant Examiner—Huyen Le
(74) Attorney, Agent, or Firm—Rankin, Hill, Porter & Clark LLP

(57) ABSTRACT

The present invention provides a method for the containment of fluids that flow from a bowl of a commode installed in an aircraft lavatory through a space between a rim of the bowl and a shroud positioned above the rim. The method includes securing a central portion of an apron against an exterior perimeter of the bowl and fastening a plurality of fastening points formed in an outer peripheral portion of the apron to fixed anchors to thereby extend and retain the outer peripheral portion of the apron away from the exterior perimeter of the bowl. Once installed, the apron is able to contain at least a portion of fluids that flow from the bowl through the space. The present invention also provides a method of servicing an aircraft lavatory between flights and a kit for use in servicing an aircraft lavatory.

23 Claims, 2 Drawing Sheets

METHOD FOR THE CONTAINMENT OF FLUIDS FROM AN AIRCRAFT COMMODE

BACKGROUND OF THE INVENTION

1. Field of Invention

The present invention relates to a method for the containment of fluids from an aircraft commode.

2. Description of Related Art

Modern commercial passenger aircraft include at least one and often several lavatories. The commodes installed in such lavatories typically comprise a metal bowl having a base that is in fluid communication with a waste holding tank. All portions of the commode, except for the inner surface of the bowl, are typically concealed and covered by a removable rigid shroud, which is supported by a plurality anchors affixed to the walls of the lavatory. Ground service maintenance personnel can remove the shroud to obtain access the commode and other aircraft systems that may be installed near the base of the commode and concealed from view by the shroud. The shroud, which supports a toilet seat and a lid, provides aesthetic and easy-to-clean surfaces that are visible to users of the lavatory.

Liquid and solid waste deposited by a user into the bowl of the commode is transferred to the waste holding tank using a vacuum system. In addition, a quantity of chemical disinfectant fluid, which is typically blue in color and is thus sometimes referred to in the airline industry as "blue juice," is pumped into contact with the inner sides of the bowl during waste transfer to rinse liquid and solid waste from the inner surface of the bowl to the waste holding tank and to sanitize and disinfect the inner surface of the bowl for subsequent users.

In many commercial aircraft, there is no fluid-tight seal between the shroud and the rim of the bowl of the commode to avoid the creation of zones within the passenger cabin that are at different air pressures. Thus, a space or gap exists between the shroud and rim through which fluids can flow or leak. And such leaks do occur with some degree of regularity.

For example, during ground servicing operations, waste material must be pumped out of the waste holding tank and a fresh supply of chemical disinfectant fluid must be charged into the system. During such ground servicing operations, an oversupply of chemical disinfectant fluid is sometimes pumped into the system. This fluid can flow into and fill up the commode bowl and then flow between the space between the rim of the commode bowl and the shroud. The fluid flowing out of the bowl and into the aircraft can damage avionics and other systems concealed beneath the shroud, can seep into the luggage compartment and other areas of the aircraft, and can flow across the floor of the lavatory and into the passenger cabin. It takes a significant amount of time to clean up an aircraft that has been oversupplied with chemical disinfectant fluid. The aircraft must be removed from service during this time, which results in significant expense to the airline.

Must less frequently, fluids can flow out of commodes in aircraft lavatories during flight, such as when the commode becomes clogged with waste or paper or when the aircraft experiences turbulence or other in-flight conditions that can result in the escape of fluid. In some aircraft, such as a DC-9, water from the sink adjacent to the toilet drains into the toilet. If the toilet is not flushed and the water is left running by a user, the water will flow out of the bowl and onto the floor. See, e.g., Adrienne P. Samuels, St. Petersburg Times, Sep. 20, 2002, *Airliner's Lavatory Leaks into Luggage Area*. A method for the containment of such fluids is needed.

BRIEF SUMMARY OF THE INVENTION

The present invention provides a method for the containment of fluids that flow from a bowl of a commode installed in an aircraft lavatory through a space between a rim of the bowl and a shroud positioned above the rim. The method comprises securing a central portion of an apron against an exterior perimeter of the bowl and fastening a plurality of fastening points formed in an outer peripheral portion of the apron to fixed anchors to thereby extend and retain the outer peripheral portion of the apron away from the exterior perimeter of the bowl. Once installed, the apron is able to contain at least a portion of fluids that flow from the bowl through the space between the rim of the bowl and the shroud positioned above the rim.

In the presently most preferred embodiment of the invention, the apron comprises a sheet of flexible multilayer material. A first ply of the multilayer material comprises a fluid impermeable barrier ply and a second ply of the multilayer material comprises an absorbent material. The apron is preferably held against the exterior perimeter of the bowl using a band of aluminum. The fixed anchors supporting the outer peripheral portion of the apron are preferably fastened to the walls of the lavatory.

The present invention also provides a kit for use in servicing an aircraft lavatory. The kit comprises an apron and optionally a supply of disposable absorbent material, a disposable floor covering for placement on the floor of the lavatory, and a disposable supplemental lavatory service pad.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
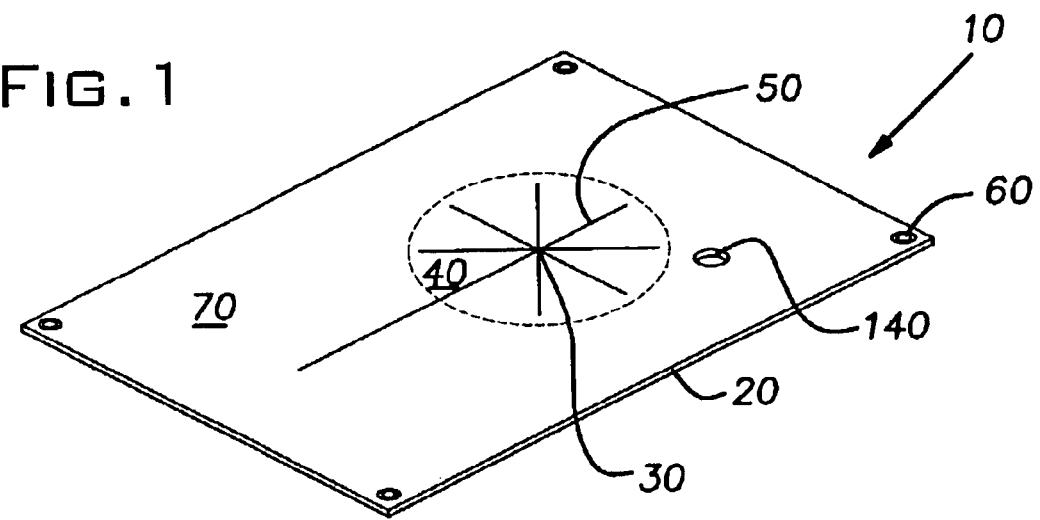
FIG. 1 is a perspective view of a preferred embodiment of an apron for use in the present invention.

A preferred embodiment of an apron 10 for use in the invention is shown in FIG. 1. The apron 10 comprises a sheet 20 that is preferably formed of a flexible multilayer material comprising at least a first ply and a second ply. The first ply preferably comprises a fluid impermeable barrier ply and the second ply preferably comprises an absorbent material, which may be treated with an anti-microbial agent. Although a multilayer material is presently preferred, it will be appreciated that virtually any material can be used to form the sheet provided the material meets the testing criteria set forth in Part I of Appendix F of 14 C.F.R. Chapter 1, Part 25.

Figure 2:
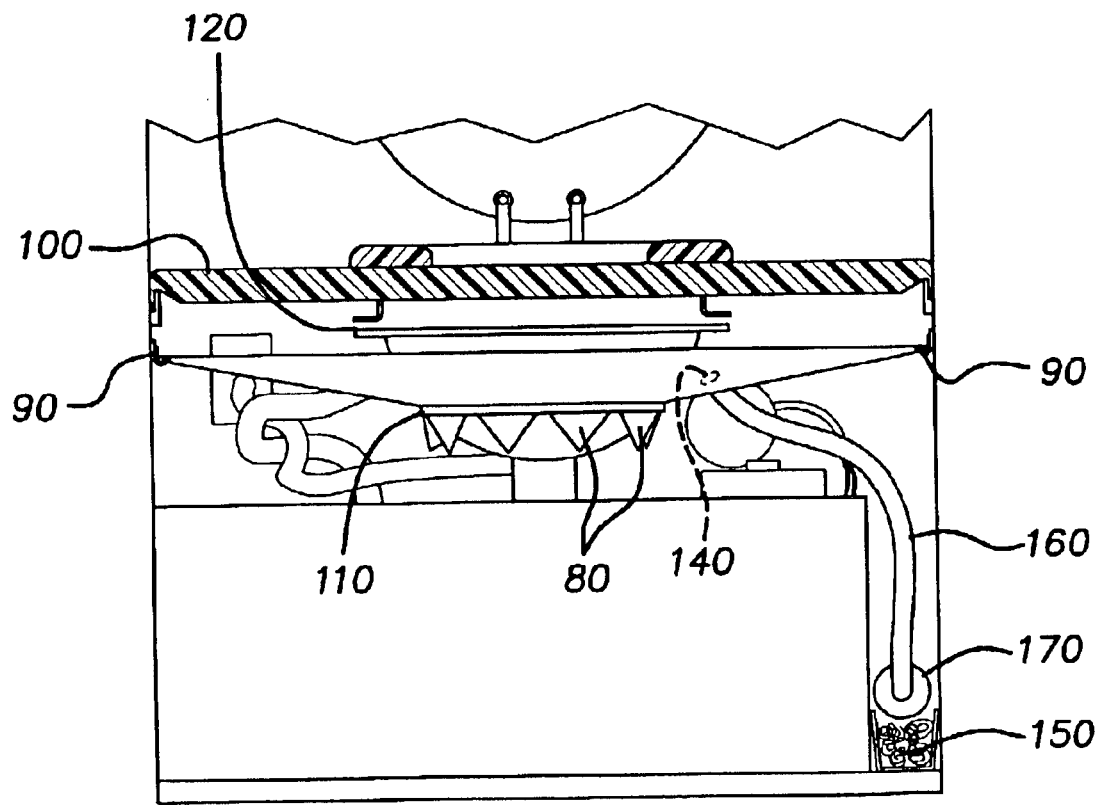
FIG. 2 is a front view of a commode in an aircraft lavatory, with a portion of the shroud cut away, having an apron installed in accordance with the invention.

An opening 30 is formed in a central portion 40 of the sheet 20. The opening 30 must be sized such that the central portion 40 of the apron 10 can be pressed into contact with an exterior perimeter of a bowl of a commode when the apron 10 is secured to the bowl. Although material can be removed from the central portion 40 of the sheet 20 to form the opening 30, it is preferable that the opening 30 be formed in the central portion 40 of the sheet 20 simply by cutting a plurality of intersecting slits 50 in central portion 40 of the sheet. When the bowl of the commode is placed through the opening 30, a plurality of triangular-shaped tails 80 are exposed, which can be used to help secure the central portion 40 of the apron 10 against the exterior perimeter of the bowl of the commode as shown in FIG. 2.

Figure 3:
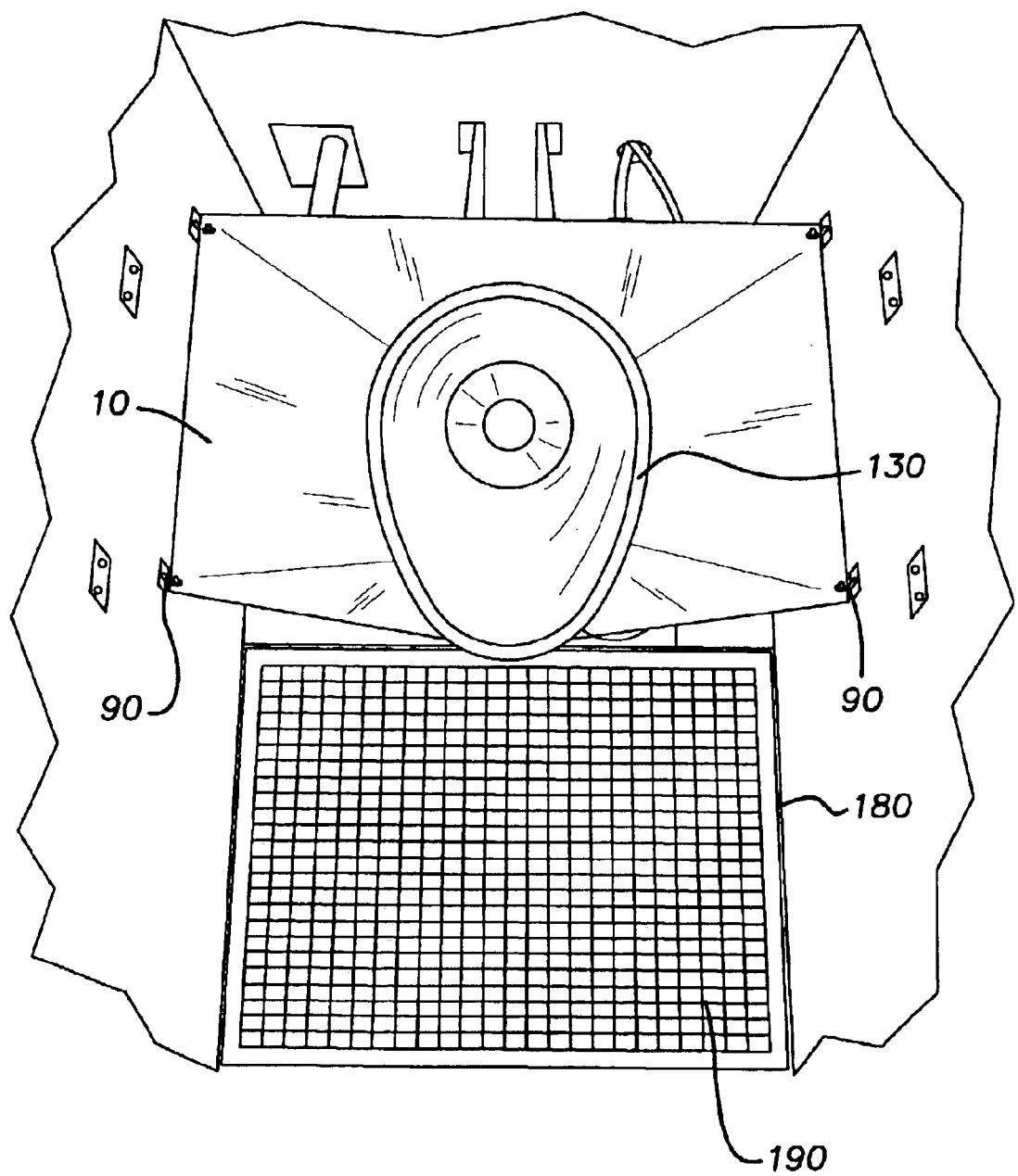
FIG. 3 is a top perspective view of a commode in an aircraft lavatory with the shroud removed and a disposable floor covering installed on the floor.

At least two, and preferably four or more generally opposing fastening points 60 are formed in an outer peripheral portion 70 of the sheet 20. The fastening points 60 are preferably reinforced by grommets. The fastening points 60 are used to secure the outer peripheral portion 70 of the apron 10 to fixed anchors 90, which may be attached to the walls of the lavatory as shown in FIG. 3 or attached to other supporting structure located beneath a shroud 100 (Note: In FIG. 2, the front portion of shroud 100 is cut away to show the structure beneath the shroud). In accordance with the method of the invention, the central portion 40 of the apron 10 is secured against the exterior perimeter of the bowl and the plurality of fastening points 60 are fastened to the fixed anchors 90 to thereby extend and retain the outer peripheral portion 70 of the apron 10 away from the exterior perimeter of the bowl.

In the preferred embodiment of the invention, the central portion 40 of the apron 10 is secured against the exterior perimeter of the bowl using a band of aluminum 110. The band of aluminum 110 preferably includes a buckle or other fastening device that allows for the quick installation and replacement of the apron 10 by ground service personnel. The outer peripheral portion 70 of the apron is then stretched outwardly and the fastening points 60 are fastened to the fixed anchors 90. The apron 10 thus forms a large receptacle for fluids that may flow through the space 120 between the shroud 100 and the rim 130 of the commode bowl.

The central portion 40 of the apron 10 can be secured against the exterior perimeter of the bowl at virtually any location. In one embodiment, the central portion 40 of the apron 10 is secured against the exterior perimeter of the bowl proximate the rim 130. Preferably, however, the central portion 40 of the apron 10 can be secured against the exterior perimeter of the bowl near the base of the bowl as illustrated in FIG. 2. The latter arrangement is preferred because it creates a larger and deeper receptacle for fluids.

In a preferred embodiment of the invention, the apron 10 is provided with at least one drain port 140. The drain port 140 is preferably situated proximate the central portion 40 of the apron 10. The drain port 140 provides a via that allows at least a portion of the fluid that may flow through the space 120 between the shroud 100 and the rim 130 of the bowl to be directed through the drain port 140 to a collection point 150. One end of a conduit 160, such as a flexible hose, is preferably connected to the drain port 140, and the other end of the conduit is positioned at the collection point 150. The collection point 150 can be a vessel 170 or, more preferably, it comprises a supply of disposable absorbent material positioned in a predetermined location beneath the shroud. The supply of disposable absorbent material can be retained in a tray or bottle.

Thus, in accordance with the invention, fluids that flow from the bowl of the commode through the space 120 between the rim 130 of the bowl and the shroud 100 positioned above the rim 130 drip or pour onto and are contained on the apron 10. Preferably, the apron 10 includes an absorbent ply, which can absorb and thus contain a considerable volume of fluid. The apron 10 also preferably includes a drain port 140, which directs unabsorbed fluid through a conduit 160 to a collection point 150. Thus, fluids do not leak into and damage avionics and other systems concealed beneath the shroud, seep into the luggage compartment and other areas of the aircraft, or flow across the floor of the lavatory and into the passenger cabin.

In the preferred embodiment, the apron is disposable and is inspected and replaced on a fixed rotation, such as every two days to week. Alternatively, the apron can be routinely inspected by ground service personnel and only replaced on an as-needed basis.

Instead of a flexible material, it will be appreciated that the apron can be formed of a rigid material, such as metal or plastic, which can be secured to the exterior perimeter of the bowl. In such an arrangement, a supply of absorbent material is preferably placed into the apron to absorb and fluids that may flow from the bowl onto the apron. This embodiment is less desirable than the use of disposable aprons, primarily because it can be difficult to install rigid aprons around the exterior perimeter of a commode bowl in some aircraft lavatories.

Preferably, the apron is provided as part of a kit, which is used by ground service personnel during the between-flight servicing of the aircraft. In addition to the apron, the kit can further comprise a disposable floor covering 180 for placement on the floor of the lavatory, as shown in FIG. 3. The disposable floor covering 180 preferably comprises a moisture impermeable base that contacts the floor, a perforated top 190 for supporting the weight of a user of the lavatory, and an absorbent portion disposed between the moisture impermeable base and the perforated top. The disposable floor covering 180 is preferably shaped and sized to cover the entire floor area of the lavatory. Fluids that are spilled by users of the lavatory, urine and/or other fluids that spill, leak or flow onto the floor of the lavatory are captured and contained by the absorbent portion of the disposable floor covering.

In the preferred embodiment, the disposable floor covering is unitary, meaning that the impermeable base that contacts the floor, the perforated top and the absorbent portion disposed between the moisture impermeable base and the perforated top are joined together as a single unit. Alternatively, the base and top can be joined together using a hinge on one side, and absorbent portion is replaceable.

The kit also preferably includes a supplemental lavatory service pad. A supplemental lavatory service pad comprises a sheet of absorbent material joined to a moisture impermeable backing. The supplemental lavatory service pad can be placed on the floor of the lavatory or on the disposable floor covering during ground servicing operations. The supplemental lavatory service pad absorbs spilled fluids, and prevents them from reaching the passenger compartment or other portions of the aircraft.

The kit according to the invention can further optionally comprise a supply of disposable absorbent material, which is typically provided in rolls. The disposable absorbent material can be placed on the apron after it has been installed to increase the amount of fluid that can be absorbed and contained by the apron. The disposable absorbent material can be placed at the collection point to absorb any fluid that may pass through the drain port. And, the disposable absorbent material can be placed on other sensitive aircraft systems that may be situated beneath the shroud to protect them from leaks and spills.

The present invention also provides a method of servicing an aircraft lavatory between flights. In accordance with the method, ground service personnel place a supplemental lavatory service pad onto the floor of the lavatory. Waste is then pumped out of the waste holding tank and the system is charged with a fresh supply of chemical disinfectant fluid. Ground service personnel then remove the shroud to obtain access to the base of the commode. If an apron is installed, the existing apron is removed and any fluid that may be contained in the apron and/or in the collection point is collected and disposed of. The central portion of a new apron is then secured against the exterior perimeter of a bowl of the commode. The fastening points of the new apron are then fastened to the fixed anchors to thereby extend and retain the outer peripheral portion of the replacement apron away from the exterior perimeter of the bowl. A new supply of absorbent material is placed at the collection point and the shroud is reinstalled. The supplemental lavatory service pad is then removed and discarded and a disposable floor covering is placed onto the floor of the lavatory.

It will be appreciated that the invention can be utilized in applications other than commercial aircraft, such as are installed in railroad passenger coaches, buses and recreational vehicles. The invention can be used in any vacuum commode application where fluid containment is needed.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method for the containment of fluids that flow from a bowl of a commode installed in an aircraft lavatory through a space between a rim of the bowl and a shroud positioned above the rim, the method comprising:

providing an apron, the apron comprising a sheet having an opening formed in a central portion thereof and a plurality of fastening points formed in an outer peripheral portion thereof;

securing the central portion of the apron against an exterior perimeter of the bowl; and fastening the plurality of fastening points to fixed anchors to thereby extend and retain the outer peripheral portion of the apron away from the exterior perimeter of the bowl, wherein at least a portion of fluids that flow from the bowl through the space between the rim of the bowl and the shroud positioned above the rim are contained by the apron.

2. The method according to claim 1 wherein the sheet is a flexible multilayer material comprising at least a first ply and a second ply, wherein the first ply comprises a fluid impermeable barrier ply and the second ply comprises an absorbent material.

3. The method according to claim 2 wherein the absorbent material is treated with an anti-microbial agent.

4. The method according to claim 1 wherein the central portion of the apron is secured against the exterior perimeter of the bowl using a band of aluminum.

5. The method according to claim 1 wherein the fastening points formed in the outer peripheral portion of the apron are reinforced by grommets.

6. The method according to claim 1 wherein the central portion of the apron is secured against the exterior perimeter of the bowl proximate the rim.

7. The method according to claim 1 wherein the apron is provided with at least one drain port for permitting at least a portion of the fluids that flow from the bowl through the space between the rim of the bowl and the shroud positioned above the rim to be directed through the drain port to a collection point.

8. The method according to claim 7 wherein the collection point comprises a supply of disposable absorbent material positioned in a predetermined location beneath the shroud.

9. The method according to claim 1 further comprising installing a disposable floor covering on a floor of the lavatory, the disposable floor covering comprising a moisture impermeable base that contacts the floor, a perforated top for supporting the weight of a user of the lavatory, and an absorbent portion disposed between the moisture impermeable base and the perforated top.

10. The method according to claim 9 wherein the disposable floor covering is unitary.

11. The method according to claim 9 further comprising laying a supplemental lavatory service pad on the disposable floor covering, the supplemental lavatory service pad comprising a sheet of absorbent material joined to a moisture impermeable backing.

12. The method according to claim 1 wherein the apron is disposable.

13. A kit for use in servicing an aircraft lavatory comprising:

an apron, the apron comprising a sheet having an opening formed in a central portion thereof and a plurality of fastening points formed in an outer peripheral portion thereof, the opening being arranged such that the central portion of the apron can be secured against an exterior perimeter of a bowl of a commode installed in the aircraft lavatory, and the plurality of fastening points being arranged such that they can be fastened to fixed anchors to thereby extend and retain the outer peripheral portion of the apron away from the exterior perimeter of the bowl.

14. The kit according to claim 13 wherein the sheet is a flexible multilayer material comprising at least a first ply and a second ply, wherein the first ply comprises a fluid impermeable barrier ply and the second ply comprises an absorbent material.

15. The kit according to claim 14 wherein the absorbent material is treated with an anti-microbial agent.

16. The kit according to claim 13 further comprising a band of aluminum for securing the central portion of the apron against the exterior perimeter of the bowl.

17. The kit according to claim 13 wherein the fastening points formed in the outer portion of the apron are reinforced by grommets.

18. The kit according to claim 13 wherein the apron is provided with at least one drain port.

19. The kit according to claim 13 further comprising:
    a supply of disposable absorbent material.

20. The kit according to claim 13 further comprising:
    a disposable floor covering for placement on a floor of the lavatory, the disposable floor covering comprising a moisture impermeable base that contacts the floor, a perforated top for supporting the weight of a user of the lavatory, and an absorbent portion disposed between the moisture impermeable base and the perforated top.

21. The kit according to claim 20 wherein the disposable floor covering is unitary.

22. The kit according to claim 20 further comprising:

a supplemental lavatory service pad for placement on the disposable floor covering, the supplemental lavatory service pad comprising a sheet of absorbent material joined to a moisture impermeable backing.

23. A method of servicing an aircraft lavatory between flights comprising:

securing a central portion of an apron against an exterior perimeter of a bowl of a commode installed in the aircraft lavatory, the apron comprising a sheet having an opening formed in the central portion thereof and a plurality of fastening points formed in an outer peripheral portion thereof, fastening the plurality of fastening points formed in the apron to fixed anchors to thereby extend and retain the outer peripheral portion of the apron away from the exterior perimeter of the bowl;

placing a disposable floor covering on a floor of the lavatory, the disposable floor covering comprising a moisture impermeable base that contacts the floor, a perforated top for supporting the weight of a user of the lavatory, and an absorbent portion disposed between the moisture impermeable base and the perforated top;

optionally, positioning a supplemental lavatory service pad on the disposable floor covering, the supplemental lavatory service pad comprising a sheet of absorbent material joined to a moisture impermeable backing; and charging a supply of fluid to a holding tank that is in fluid connection with the commode.

* * * * *